Dec. 18, 1923.

A. SECHLER 1,477,981

COOKING UTENSIL

Filed July 14, 1922

Inventor:
Anna Sechler.
By Milo B. Stevens & Co.
Attorneys

Patented Dec. 18, 1923.

1,477,981

UNITED STATES PATENT OFFICE.

ANNA SECHLER, OF CHICAGO, ILLINOIS.

COOKING UTENSIL.

Application filed July 14, 1922. Serial No. 574,907.

*To all whom it may concern:*

Be it known that I, ANNA SECHLER, a citizen of the United States, residing at Chicago, in the county of Cook and State of Illinois, have invented new and useful Improvements in Cooking Utensils, of which the following is a specification.

My invention relates to cooking utensils and more particularly to covers for cooking vessels, it having for its primary object the provision of a novel and improved cover for use upon frying pans or like vessels so that the grease in sputtering and splashing in the pan during the cooking operation will be caught and prevented from dropping on the stove or splashing upon the person or clothing of the attendant.

A further object of the invention is to provide a cover of the kind stated whereby any gases within the vessel may escape but which will cause any grease or liquid gathering upon the cover to be drained back into the vessel.

A still further object of the invention is to furnish a cover of the character set forth which will admit of inspection of the contents of the vessel or the addition thereto without removal of the cover.

The above and other objects are attained by means of certain novel features of construction and arrangement of the various parts, to be hereinafter described and claimed, and in order that the same may be better understood, reference is had to the accompanying drawing, forming a part of this specification.

Figure 1:
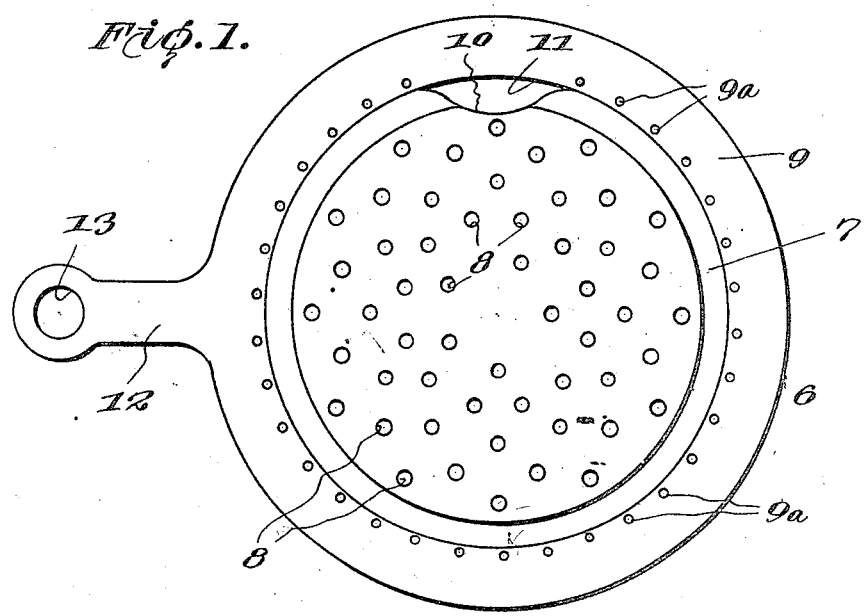
Figure 1 is a plan view of the cover removed.
Figure 2:
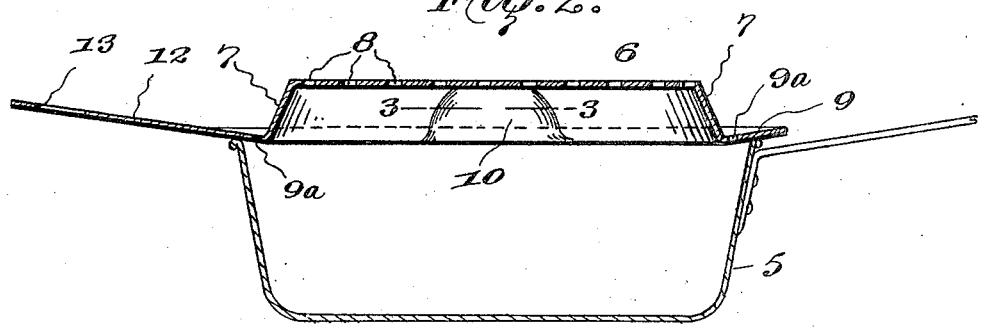
Fig. 2 is a sectional elevation of a cooking vessel with my cover thereon.
Figure 3:
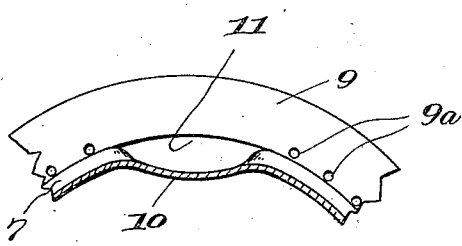
Fig. 3 is a section on the line 3—3 of Fig. 2.

Referring specifically to the drawing, wherein the preferred embodiment of the invention is disclosed and in which like reference characters designate like parts throughout the several views, numeral 5 denotes a frying pan or similar vessel upon which my cover 6 is placed. The cover 6 which forms the subject matter of the present invention resembles an inverted frying pan, being provided with an outwardly sloped circumferential side wall 7 and a handle 12. From the bottom edge of the wall 7, there extends a lateral circumferential flange 9 of considerable width the same having a slight upward incline toward its outer edge and being provided with apertures 9ª adjacent the wall 7 so that any liquid which may gather between the flange and the wall will be drained back into the vessel 5 again. The top of the cover 6 is formed with a plurality of apertures 8 to permit the escape of gases from beneath and through which any liquid condensing thereon may drain back into the vessel 5.

In order that the contents of the vessel 5 may be viewed or supplemented without removal of the cover, I have provided a short transverse slit at the junction of the side wall 7 and the flange 9, the wall portion being bulged inwardly as shown at 10 to form the opening 11 between the flange 9 and the wall, through which a spoon or kettle spout may be inserted. The top portion of the cover may also be slightly indented to conform to the contour of the inwardly bulged portion 10 of the side wall 7.

From the foregoing description read in connection with the accompanying drawing the novel features of construction of my cover will be readily apparent. The relatively wide flange 7 permits the device to be placed upon the rims of vessels of varying sizes, and the slight upward angle at which it is disposed causes any liquid gathering thereon to drain back into the vessel rather than upon the top of the stove. By forming the opening 11 in the manner specified the bulged-in portion 10 of the side wall 7 acts as a skirt to prevent the splashing or sputtering of grease therethrough.

In accordance with the patent statutes, I have described the preferred embodiment of my invention, but it will be understood that I do not propose to limit myself strictly thereto, since various changes and modifications thereof will immediately suggest themselves to those skilled in the art, within the spirit of my invention, the scope of which is set forth in the appended claims.

Having thus described my invention, what I claim as new and desire to secure by Letters Patent:

1. A cover for cooking vessels having a raised top portion, the sides of said cover sloping outwardly therefrom, a laterally directed and upwardly inclined flange extending from the bottom edges of said cover, said flange having transverse apertures at the inner edge thereof and a short transverse slit therethrough, and a portion of the side wall adjacent said slit being bulged inwardly with its bottom edge spaced from said flange to form a depending skirt substantially as described.

2. A cover for cooking vessels having a raised top portion, the sides of said cover sloping outwardly therefrom, a lateral circumferential flange carried by the bottom edge of said cover, said circumferential flange having a short transverse slit therethrough, and a portion of the side wall adjacent said slit being bulged inwardly with its bottom edge spaced from said flange, said bulged in portion forming a substantially vertical depending skirt to prevent the egress of spattering grease through the opening between said flange and the outer wall of said skirt.

In testimony whereof I affix my signature.

ANNA SECHLER.